(12) United States Patent
Chen

(10) Patent No.: US 10,317,047 B2
(45) Date of Patent: Jun. 11, 2019

(54) FILTERING UNIT AND APPARATUS

(71) Applicant: Shenzhen China Star Optoelectronics Technology Co., Ltd., Shenzhen, Guangdong (CN)

(72) Inventor: Jie Chen, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 147 days.

(21) Appl. No.: 14/779,071

(22) PCT Filed: Jun. 17, 2015

(86) PCT No.: PCT/CN2015/081638
§ 371 (c)(1),
(2) Date: Sep. 22, 2016

(87) PCT Pub. No.: WO2016/192134
PCT Pub. Date: Dec. 8, 2016

(65) Prior Publication Data
US 2017/0097140 A1  Apr. 6, 2017

(30) Foreign Application Priority Data
Jun. 2, 2015 (CN) .......................... 2015 1 0300479

(51) Int. Cl.
*F21V 14/08* (2006.01)
*F21V 17/06* (2006.01)
(Continued)

(52) U.S. Cl.
CPC ................ *F21V 14/08* (2013.01); *F21V 9/06* (2013.01); *F21V 17/06* (2013.01); *G02B 26/008* (2013.01)

(58) Field of Classification Search
CPC ....... G02B 26/008; G02B 6/006; F21V 14/04; F21V 9/09; F21V 17/06
See application file for complete search history.

(56) References Cited

U.S. PATENT DOCUMENTS

| | | | |
|---|---|---|---|
| 8,059,327 | B1 | 11/2011 | Erdogan et al. |
| 2004/0174513 | A1* | 9/2004 | Han ....................... G03B 27/72 |
| | | | 355/71 |

(Continued)

FOREIGN PATENT DOCUMENTS

| CN | 101424839 A | 5/2009 |
|---|---|---|
| CN | 102713543 A | 10/2012 |

(Continued)

*Primary Examiner* — William R Alexander
*Assistant Examiner* — Ephrem Z Mebrahtu
(74) *Attorney, Agent, or Firm* — Andrew C. Cheng

(57) ABSTRACT

The present invention discloses a filtering unit, comprising a plurality of filters, a fixing element and a drive controller. The fixing element is located on a body of the apparatus to be employed for fixedly supporting the plurality of filters. The plurality of filters are rotatably located on the fixing element. The drive controller is coupled to the plurality of filters to drive the corresponding filter rotating according to preset instructions to make light emitted by the lamp pass through the corresponding filter and to filter out light of a corresponding wavelength. Therefore, with the drive controller to drive the corresponding filter rotating according to preset instructions to make light emitted by the lamp pass through the corresponding filter and to filter out light of a corresponding wavelength, the replacement of the filters can be achieved without the manual operation.

8 Claims, 2 Drawing Sheets

(51) Int. Cl.
*F21V 9/06* (2018.01)
*G02B 26/00* (2006.01)

(56) References Cited

U.S. PATENT DOCUMENTS

| | | | |
|---|---|---|---|
| 2005/0030659 A1 | 2/2005 | Asakawa | |
| 2008/0273205 A1* | 11/2008 | Lee | G01N 21/253 356/440 |
| 2010/0145419 A1* | 6/2010 | Fraval | A61N 5/062 607/94 |
| 2012/0314295 A1* | 12/2012 | Fukuyo | G01J 3/12 359/589 |

FOREIGN PATENT DOCUMENTS

| | | |
|---|---|---|
| CN | 104614834 A | 5/2015 |
| JP | S63311319 A | 12/1988 |
| JP | H04323655 A | 11/1992 |
| JP | 2003329938 A | 11/2003 |
| JP | 2007206456 A | 8/2007 |
| WO | 0128254 A1 | 4/2001 |

* cited by examiner

FILTERING UNIT AND APPARATUS

CROSS REFERENCE

This application claims the priority of Chinese Patent Application No. 201510300479.5, entitled "Filtering unit and apparatus", filed on Jun. 2, 2015, the disclosure of which is incorporated herein by reference in its entirety.

FIELD OF THE INVENTION

The present invention relates to an electronic technology field, and more particularly to a filtering unit and an apparatus.

BACKGROUND OF THE INVENTION

In the cell process according to prior art, due to the relation of the manufacture, the ultraviolet lights of various wavelengths are required for irradiation to the glass substrates. Meanwhile, as regarding the new technology and the new material, the other ultraviolet lights of the main wavelengths might be used in the future. Therefore, the manual replacement of the corresponding filter according to various requirements of the user is necessary to filter out the ultraviolet light of a corresponding wavelength to irradiate the material. Thus, it wastes the man power and time. If the method of replacing the filter is inappropriate, the damage of the filter can happen, and the manufacture cost is increased thereby.

SUMMARY OF THE INVENTION

An objective of the present invention is to provide a filtering unit and an apparatus, automatically replacing the corresponding filters according to the various requirements of the user to satisfy the requirements of the user. The man power and the time are saved to reduce the manufacture cost.

For realizing the aforesaid objective, the technical solution provided by the embodiments of the present invention is:

the present invention provides a filtering unit, applied in an apparatus to filter light emitted by a lamp of the apparatus, wherein the filtering unit comprises a plurality of filters, a fixing element and a drive controller, and the fixing element is located on a body of the apparatus to be employed for fixedly supporting the plurality of filters, and the plurality of filters are rotatably located on the fixing element, and the drive controller is coupled to the plurality of filters to drive the corresponding filter rotating according to preset instructions to make light emitted by the lamp pass through the corresponding filter and to filter out light of a corresponding wavelength.

The drive controller comprises a setting unit, a storage unit and an invoking unit, and the setting unit is employed to set preset instructions, and the storage unit is employed to store the preset instructions, and the invoking unit is employed to invoke the preset instructions to drive the corresponding filter rotating according to the invoked preset instructions to make the light emitted by the lamp pass through the corresponding filter and to filter out the light of the corresponding wavelength.

The fixing element comprises a first fixing column, and first ends of the plurality of filters are rotatably located on the first fixing column to make the plurality of filters rotatably cross above the lamp.

The fixing element further comprises a second fixing column, and the first fixing column and the second fixing column are positioned at two sides of the lamp, and second ends of the plurality of filters are rotatably located on the second fixing column to make the plurality of filters rotatably cross above the lamp.

The plurality of filters are circular arcs, and radii of the plurality of filters are different to cross above the lamp in an overlapping manner.

The present invention further provides an apparatus, employed for irradiating a glass substrate, wherein the apparatus comprises a body, a partition plate above the body, a lamp and a filtering unit located above the partition plate, and the filtering unit is employed to filter light emitted by the lamp, and the filtering unit comprises a plurality of filters, a fixing element and a drive controller, and the fixing element is located on a body of the apparatus to be employed for fixedly supporting the plurality of filters, and the plurality of filters are rotatably located on the fixing element, and the drive controller is coupled to the plurality of filters to drive the corresponding filter rotating according to preset instructions to make light emitted by the lamp pass through the corresponding filter and to filter out light of a corresponding wavelength.

The drive controller comprises a setting unit, a storage unit and an invoking unit, and the setting unit is employed to set preset instructions, and the storage unit is employed to store the preset instructions, and the invoking unit is employed to invoke the preset instructions to drive the corresponding filter rotating according to the invoked preset instructions to make the light emitted by the lamp pass through the corresponding filter and to filter out the light of the corresponding wavelength.

The fixing element comprises a first fixing column, and first ends of the plurality of filters are rotatably located on the first fixing column to make the plurality of filters rotatably cross above the lamp.

The fixing element further comprises a second fixing column, and the first fixing column and the second fixing column are positioned at two sides of the lamp, and second ends of the plurality of filters are rotatably located on the second fixing column to make the plurality of filters rotatably cross above the lamp.

The plurality of filters are circular arcs, and radii of the plurality of filters are different to cross above the lamp in an overlapping manner.

The filtering unit of the present invention comprises a plurality of filters, a fixing element and a drive controller. The fixing element is located on a body of the apparatus to be employed for fixedly supporting the plurality of filters. The plurality of filters are rotatably located on the fixing element. The drive controller is coupled to the plurality of filters to drive the corresponding filter rotating according to preset instructions to make light emitted by the lamp pass through the corresponding filter and to filter out light of a corresponding wavelength. Therefore, with the drive controller to drive the corresponding filter rotating according to preset instructions to make light emitted by the lamp pass through the corresponding filter and to filter out light of a corresponding wavelength, the replacement of the filters can be achieved without the manual operation to satisfy the various requirements of the user. The man power and the time are saved to reduce the manufacture cost.

BRIEF DESCRIPTION OF THE DRAWINGS

In order to more clearly illustrate the embodiments of the present invention, the following figures will be described in the embodiments are briefly introduced. It is obvious that the drawings are only some embodiments of the present invention, those of ordinary skill in this field can obtain other figures according to these figures without paying the premise.

DETAILED DESCRIPTION OF PREFERRED EMBODIMENTS

For better explaining the technical solution and the effect of the present invention, the present invention will be further described in detail with the accompanying drawings in the specific embodiments.

Figure 1:
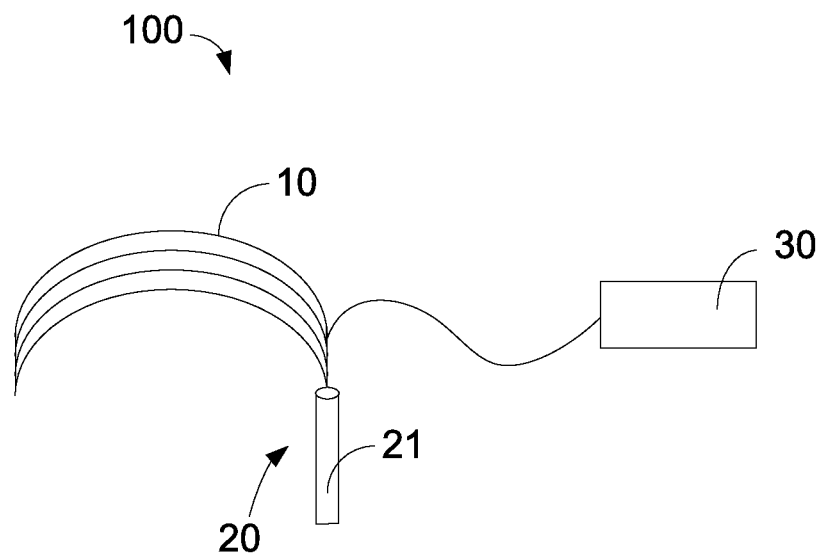
FIG. 1 is a diagram of a filtering unit provided by the first preferred embodiment of the first solution according to the present invention.

Please refer to FIG. 1. The preferred embodiment of the first solution according to the present invention provides a filtering unit 100. The filtering unit 100 is applied in an apparatus to filter light emitted by a lamp of the apparatus. The filtering unit 100 comprises a plurality of filters 10, a fixing element 20 and a drive controller 30. The fixing element 20 is located on a body of the apparatus to be employed for fixedly supporting the plurality of filters 10. The plurality of filters 10 are rotatably located on the fixing element 20. The drive controller 30 is coupled to the plurality of filters 10 to drive the corresponding filter 10 rotating according to preset instructions to make light emitted by the lamp pass through the corresponding filter 10 and to filter out light of a corresponding wavelength.

Specifically, in this embodiment, each filter 10 has an ID, and the IDs of the filters 10 are different. The preset instructions are preset in the drive controller 30. The preset instructions comprise the ID of the filter 10 which is required to be rotated. When the filtering unit 100 is activated, the drive controller 30 activates the work to invoke the preset instructions therein, and confirms the filter 10 required to be rotated according to the ID in the preset instructions, and thus to drive the filter 10 corresponding to the ID to be rotated between the lamp and the glass substrate positioned on the body of the apparatus. Therefore, the light emitted by the lamp is filtered by the filter 10 and the corresponding filtered light irradiates the glass substrate.

In this embodiment, the filtering unit 100 comprises a plurality of filters 10, a fixing element 20 and a drive controller 30. The fixing element 20 is located on a body of the apparatus to be employed for fixedly supporting the plurality of filters 10. The plurality of filters 10 are rotatably located on the fixing element 20. The drive controller 30 is coupled to the plurality of filters 10 to drive the corresponding filter 10 rotating according to preset instructions to make light emitted by the lamp pass through the corresponding filter 10 and to filter out light of a corresponding wavelength. Therefore, in this embodiment, with the drive controller 30 to drive the corresponding filter 10 rotating according to preset instructions to make light emitted by the lamp pass through the corresponding filter 10 and to filter out light of a corresponding wavelength, the replacement of the filters 10 can be achieved without the manual operation to satisfy the various requirements of the user. The man power and the time are saved to reduce the manufacture cost.

Figure 2:
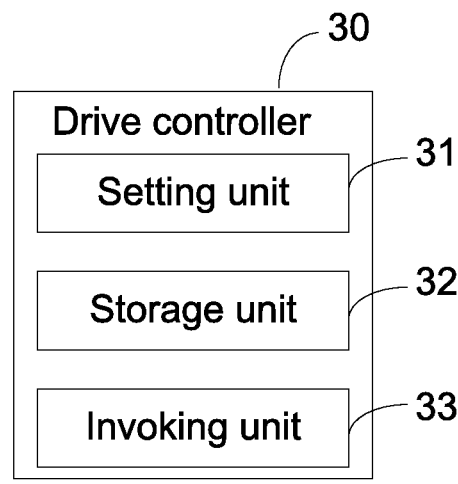
FIG. 2 is a block diagram of the drive controller in FIG. 1.

Please continue to refer to FIG. 2. Selectively, the drive controller 30 comprises a setting unit 31, a storage unit 32 and an invoking unit 33. The setting unit 31 is employed to set preset instructions. The storage unit 32 is employed to store the preset instructions. The invoking unit 33 is employed to invoke the preset instructions to drive the corresponding filter 10 rotating according to the invoked preset instructions to make the light emitted by the lamp pass through the corresponding filter 10 and to filter out the light of the corresponding wavelength.

In this embodiment, the fixing element 20 comprises a first fixing column 21. The first ends of the plurality of filters 10 are rotatably located on the first fixing column 21 to make the plurality of filters 10 rotatably cross above the lamp.

The plurality of filters 10 are circular arcs, and radii of the plurality of filters 10 are different to cross above the lamp in an overlapping manner.

Specifically, the radii of the plurality of filters 10 are different for conveniently overlapping the plurality of filters 10. Thus, the filtering unit can comprise more filters 10 and save the space, too.

In other embodiments, the appearances of the plurality of filters 10 can be adjusted according to actual demands. For example, the ellipse can be illustrated. The radii of the plurality of filters 10 can be the same, too.

Figure 3:
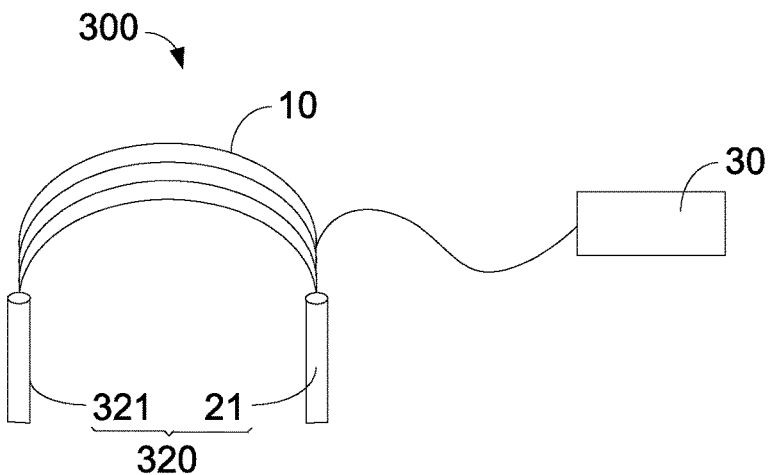
FIG. 3 is a diagram of a filtering unit provided by the second preferred embodiment of the first solution according to the present invention.

Please refer to FIG. 3. The second preferred embodiment of the first solution according to the present invention provides a filtering unit 300. The filtering unit 300 provided by the second preferred embodiment is similar with the filtering unit 100 provided by the first preferred embodiment. The difference between the two is: in the second preferred embodiment, the fixing element 320 further comprises a second fixing column 321. The first fixing column 21 and the second fixing column 321 are positioned at two sides of the lamp. Second ends of the plurality of filters 10 are rotatably located on the second fixing column 321 to make the plurality of filters 10 rotatably cross above the lamp.

Specifically, the first ends of the plurality of filters 10 are rotatably located on the first fixing column 21 and the second ends of the plurality of filters 10 are rotatably located on the second fixing column 321 to make the plurality of filters 10 rotatably cross above the lamp. This fixing arrangement can make the fixture of the plurality of filters 10 more stable.

Figure 4:
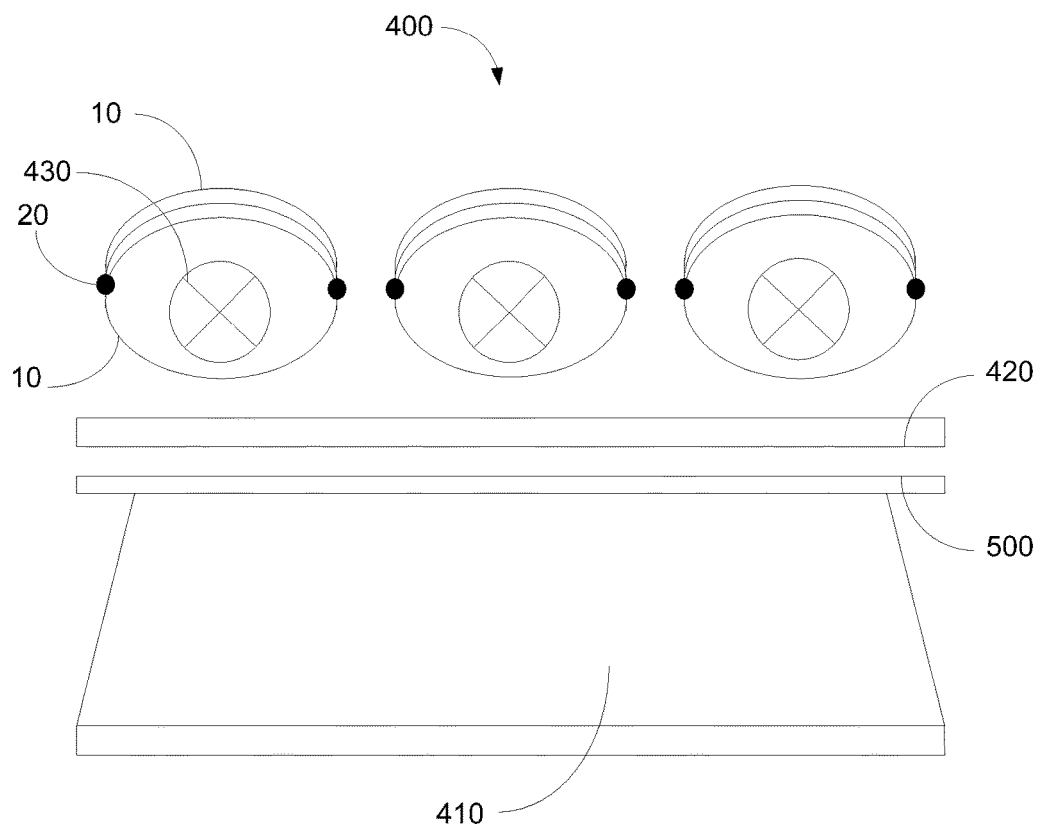
FIG. 4 is a diagram of an apparatus provided by the preferred embodiment of the second solution according to the present invention.

Please refer to FIG. 4 and FIG. 1. The preferred embodiment of the second solution according to the present invention provides an apparatus 400. The apparatus 400 is employed for irradiating a glass substrate 500. The apparatus 400 comprises a body 410, a partition plate 420 above the body 410, a lamp 430 and a filtering unit located above the partition plate 420. The filtering unit is employed to filter light emitted by a lamp 430. In this embodiment, the filtering unit can be the filtering unit 100 provided in the aforesaid by the first preferred embodiment of the first solution. The specific mechanism and function of the filtering unit is the same as the filtering unit 100 provided in the aforesaid by the first preferred embodiment of the first solution. The repeated description is omitted here.

Specifically, the apparatus 400 can comprise a plurality of lamps 430 and a plurality of filtering units 100. The amount of the filtering units 100 and the amount of the lamps 430 are the same. Before irradiating the glass substrate 500, the glass substrate 500 is positioned on the body 410. For ensuring the uniformity of the irradiation to the glass substrate 500, the partition plate 420 has to be added before the glass substrate 500 is positioned to prevent that the lamp 430 irradiates the glass substrate 500. After the glass substrate 500 is positioned on the body 410, the partition plate is removed for allowing the light emitted by the lamp 430 to irradiate the glass substrate 500.

In this embodiment, the apparatus 400 comprises the filtering unit 100. The filtering unit 100 comprises a plurality of filters 10, a fixing element 20 and a drive controller 30. The fixing element 20 is located on a body 410 to be employed for fixedly supporting the plurality of filters 10. The plurality of filters 10 are rotatably located on the fixing element 20. The drive controller 30 is coupled to the plurality of filters 10 to drive the corresponding filter 10 rotating according to preset instructions to make light emitted by the lamp pass through the corresponding filter 10 and to filter out light of a corresponding wavelength. Therefore, in this embodiment, with the drive controller to drive the corresponding filter rotating according to preset instructions to make light emitted by the lamp pass through the corresponding filter and to filter out light of a corresponding wavelength, the replacement of the filters can be achieved without the manual operation to satisfy the various requirements of the user. The man power and the time are saved to reduce the manufacture cost.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A filtering unit, applied in an apparatus to filter light emitted by a lamp of the apparatus, wherein the filtering unit comprises a plurality of filters, a fixing element and a drive controller, and the fixing element is located on a body of the apparatus to be employed for fixedly supporting the plurality of filters, and the plurality of filters are rotatably located on the fixing element, and the drive controller is coupled to the plurality of filters to drive the corresponding filter rotating according to preset instructions to make light emitted by the lamp pass through the corresponding filter and to filter out light of a corresponding wavelength to automatically replace a corresponding filter for filtering the light of the corresponding wavelength to irradiate a glass substrate; and
wherein the plurality of filters are circular arcs, and radii of the circular arcs are different, wherein a radius of a first circular arc cross above the lamp is smaller than a radius of a second circular arc cross above the first circular arc, and a radius of the second circular arc cross above the first circular arc is smaller than a radius of a third circular arc cross above the second circular arc, and the plurality of filters are rotatably located on the fixing element to cross above the lamp in an overlapping manner.

2. The filtering unit according to claim 1, wherein the drive controller comprises a setting unit, a storage unit and an invoking unit, and the setting unit is employed to set preset instructions, and the storage unit is employed to store the preset instructions, and the invoking unit is employed to invoke the preset instructions to drive the corresponding filter rotating according to the invoked preset instructions to make the light emitted by the lamp pass through the corresponding filter and to filter out the light of the corresponding wavelength.

3. The filtering unit according to claim 1, wherein the fixing element comprises a first fixing column, and first ends of the plurality of filters are rotatably located on the first fixing column to make the plurality of filters rotatably cross above the lamp.

4. The filtering unit according to claim 3, wherein the fixing element further comprises a second fixing column, and the first fixing column and the second fixing column are positioned at two sides of the lamp, and second ends of the plurality of filters are rotatably located on the second fixing column to make the plurality of filters rotatably cross above the lamp.

5. An apparatus, employed for irradiating a glass substrate, wherein the apparatus comprises a body, a partition plate above the body, a lamp and a filtering unit located above the partition plate, and the filtering unit is employed to filter light emitted by the lamp, and the filtering unit comprises a plurality of filters, a fixing element and a drive controller, and the fixing element is located on a body of the apparatus to be employed for fixedly supporting the plurality of filters, and the plurality of filters are rotatably located on the fixing element, and the drive controller is coupled to the plurality of filters to drive the corresponding filter rotating according to preset instructions to make light emitted by the lamp pass through the corresponding filter and to filter out light of a corresponding wavelength to automatically replace a corresponding filter for filtering the light of the corresponding wavelength to irradiate the glass substrate; and
wherein the plurality of filters are circular arcs, and radii of the circular arcs are different, wherein a radius of a first circular arc cross above the lamp is smaller than a radius of a second circular arc cross above the first circular arc, and a radius of the second circular arc cross above the first circular arc is smaller than a radius of a third circular arc cross above the second circular arc, and the plurality of filters are rotatably located on the fixing element to cross above the lamp in an overlapping manner.

6. The apparatus according to claim 5, wherein the drive controller comprises a setting unit, a storage unit and an invoking unit, and the setting unit is employed to set preset instructions, and the storage unit is employed to store the preset instructions, and the invoking unit is employed to invoke the preset instructions to drive the corresponding filter rotating according to the invoked preset instructions to make the light emitted by the lamp pass through the corresponding filter and to filter out the light of the corresponding wavelength.

7. The apparatus according to claim 5, wherein the fixing element comprises a first fixing column, and first ends of the plurality of filters are rotatably located on the first fixing column to make the plurality of filters rotatably cross above the lamp.

8. The apparatus according to claim 7, wherein the fixing element further comprises a second fixing column, and the first fixing column and the second fixing column are positioned at two sides of the lamp, and second ends of the plurality of filters are rotatably located on the second fixing column to make the plurality of filters rotatably cross above the lamp.

* * * * *